April 13, 1954 D. W. RICHARDSON 2,675,455
CONTROL SYSTEM FOR ELECTRIC COOKING OVENS
Filed Sept. 14, 1950 2 Sheets-Sheet 1
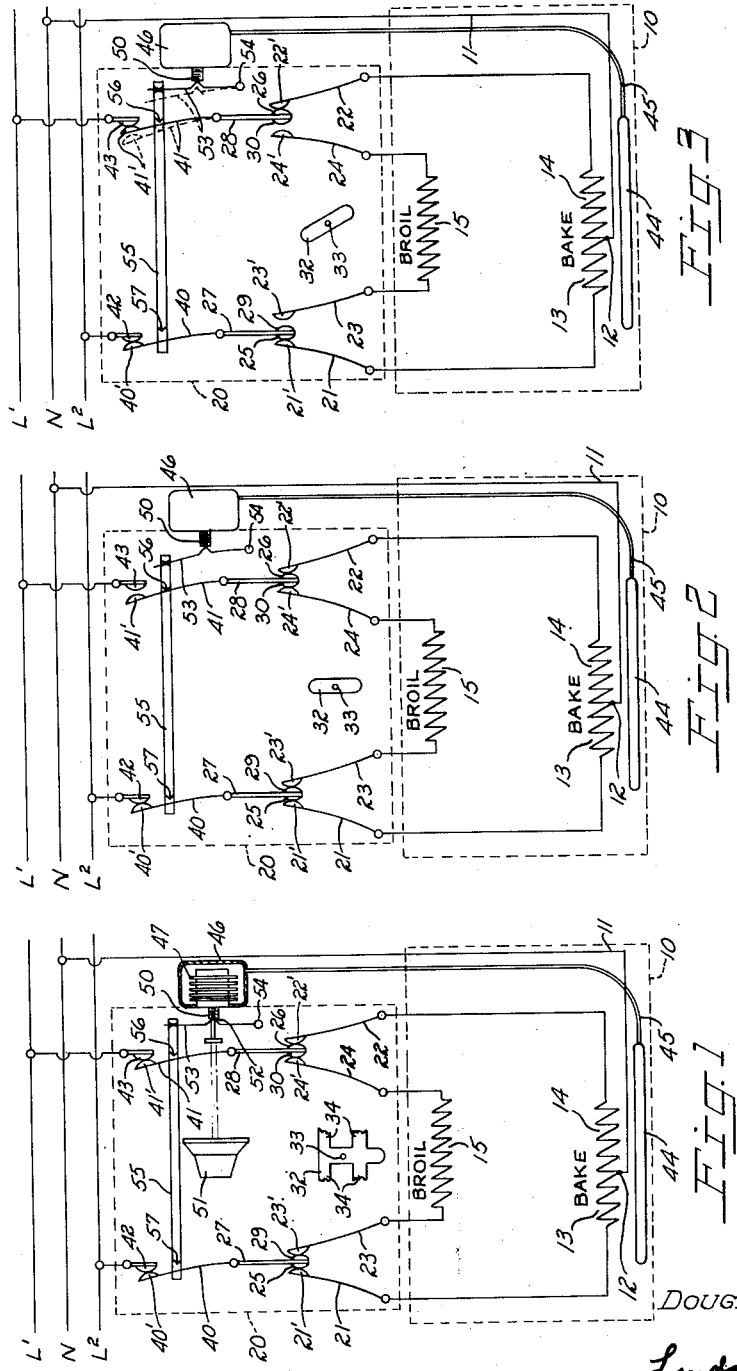
Inventor
DOUGLAS W. RICHARDSON
By Lindsey & Prutzman
Attorneys April 13, 1954   D. W. RICHARDSON   2,675,455
CONTROL SYSTEM FOR ELECTRIC COOKING OVENS
Filed Sept. 14, 1950   2 Sheets-Sheet 2

Inventor
DOUGLAS W. RICHARDSON
By Lindsey & Prutzman
Attorneys

Patented Apr. 13, 1954

2,675,455

UNITED STATES PATENT OFFICE 2,675,455

CONTROL SYSTEM FOR ELECTRIC COOKING OVENS

Douglas W. Richardson, Aurora, Ontario, Canada, assignor to The Hart Manufacturing Company, Hartford, Conn., a corporation of Connecticut Application September 14, 1950, Serial No. 184,782

7 Claims. (Cl. 219—20)

This invention relates to a system of control for electric ovens of the type having a broil element in its upper portion and a bake element in its lower portion.

An aim of the invention is to provide an improved, simplified and economical arrangement by means of which the heating elements of the oven may be variously connected to a three-wire supply system to obtain different rates of heat generation desirable and effective for expeditiously carrying out preheat roasting, baking and broiling operations with maximum heat efficiency.

A further aim of the invention is to provide an improved system of the character specified wherein the bake element, at a point between its ends, is directly connected to the neutral wire of the three-wire supply system without going through the controlling switch or switches, and which arrangement is conducive of simplicity of construction and ease of installation.

A further aim of the invention is to provide an improved arrangement whereby the oven may be pre-heated with a relatively large energy input in order to quickly bring the oven up to the desired temperature and then the heating will continue at a materially lesser rate of power consumption most economical for the particular cooking operation selected.

A still further object of the invention is to provide a system having the above and other objects and wherein the change-over from a preheating stage to a cooking stage using less current input may be thermostatically effected and the cooking operation is then proceeded with at the desired temperature which is thermostatically maintained within close limits and with a minimum of arcing between the contacts of the thermostat.

In accordance with the present invention, the oven is provided with a broil element in its upper portion and a bake element in its lower portion and the bake element intermediate its ends is directly connected to the neutral wire of the supply system at all times. Interposed between the ends of the broil element and the bake element and the outside lines of the supply system are switch means which, preferably, are in part manually operated and in part thermostatically operated. When it is desired to rapidly preheat the oven, the two elements are connected in parallel between the outside or main lines and, after the oven has been preheated, one portion of the bake element is connected across one of the outside lines and the neutral, and the broil element and the other part of the bake element are connected in series between that same line and the neutral and in parallel with the first mentioned part of the bake element so that a balanced heat condition prevails within the oven. This condition may be desirable, for example, during a roasting operation. When it is desired to provide a broiling condition, the broil element only is connected across the two outside lines. When it is desired to bring the oven up to a baking condition, without employing the broil element, the entire bake element is connected across the two outside lines. When the desired predetermined temperature for baking is attained, part of the bake element is thermostatically disconnected from the circuit and the remaining part is connected across one supply line and the neutral, so that the baking operation is proceeded with at a considerably reduced rate of consumption of power. The desired oven temperatures, either when the elements are connected for balanced heat oven condition or when only one part of the bake element is in circuit for a baking operation at a lower consumption of power, are maintained substantially uniform by the cycling of the thermostatic switch. The term "baking temperature" or "baking operation" within the description in the appended claims is intended to embrace roasting and other cooking temperatures or operations within the oven, as well as a true baking operation.

Details of these objects and of the invention, as well as other objects thereof, are set forth in the following specification and illustrated in the accompanying drawings forming a part thereof.

In the drawings:

Fig. 1 is a diagrammatic view illustrating the circuit of the system for providing preheat conditions within the electric cooking oven.

Fig. 2 is a diagrammatic view illustrating the circuit of the system for providing a balanced heat condition in the oven.

Fig. 3 is a like view illustrating the circuit of the system for providing a relatively high baking condition by the entire bake element; one of the switch elements being also shown in broken lines in open position, in which instance, a baking condition with less current input is provided by only half of the bake element.

Figure 4:
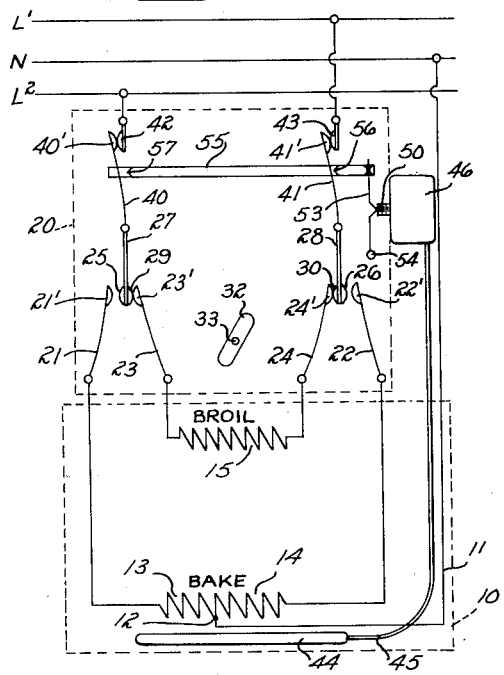
Fig. 4 is a diagrammatic view illustrating the circuit of the system for providing a broiling condition within the oven.

Referring to the drawings in detail, there is illustrated, diagrammatically, a three-wire supply circuit wherein the two main or outside lines are designated L-1 and L-2 and the neutral line is designated N. The numeral 10 designates an oven, the same being shown diagrammatically and in outline only, as it may be of usual construction found in ranges and the like. In the lower portion of the oven is a bake element which is directly connected between its ends to the neutral wire N by a connection or wire 11. The parts or portions of the bake element at opposite sides of the tap point 12 are respectively designated by numerals 13 and 14. In the top or upper portion of the oven is a broil element 15.

Figure 5:
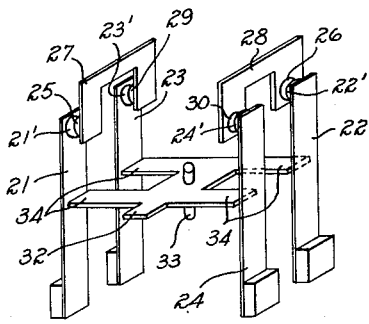
Fig. 5 is a view showing more or less schematically the manual settable switch by means of which various circuits may be established.

Interposed between the ends of the bake element 13—14 and the ends of the broil element 15 on the one hand and the outside lines of the current supply system on the other hand are switch means of any suitable construction capable of permitting the establishment of circuits in accordance with the present invention. In the present illustrative disclosure, the casing of the switch means is diagrammatically shown by the single dotted lines 20. Preferably, the switch means comprises a manually settable switch and a thermostatically operated switch. In the present instance, the manually settable switch is diagrammatically illustrated as having switch arms 21 and 22 to which the opposite ends of the bake element are respectively connected, and switch arms 23 and 24 to which the opposite ends of the broil element are connected. The switch arms 21 and 22 carry contacts 21' and 22' adapted to respectively engage fixed contacts 25 and 26 carried by terminals 27 and 28. The arms 23 and 24 carry contacts 23' and 24' respectively engageable with contacts 29 and 30 also fixed to the terminals 27 and 28. The switch arms 21, 22, 23 and 24 may be of the resilient type normally urged into closed positions as illustrated in Fig. 1, for example. Any suitable means may be provided for moving these switch arms to open positions, one such means being diagrammatically illustrated in Fig. 5. Referring to this figure, 32 designates a lever of insulating material and settable to three positions about its pivot 33. The lever has four arms 34 respectively cooperating with the spring switch arms 21, 22, 23 and 24. It is sufficient to say here that when the settable lever is in the mid-position shown in Figs. 1, 2 and 5, the switch arms are free to move to their closed position shown due to the resiliency of those arms. When the lever 32 is moved to the lefthand position shown in Fig. 3, the contacts 23 and 24 are moved to open position. When the lever 32 is moved to its other extreme position, as shown in Fig. 4, the switch arms 21 and 22 are moved to open position.

The thermostatic switch comprises switch arms 40 and 41 respectively secured to the terminals 27 and 28. These arms are similar in character to the switch arms previously referred to. They respectively carry contacts 40' and 41' which are respectively engageable with fixed contacts 42—43 respectively connected to the outside lines L-2 and L-1. Any suitable thermostat may be employed for moving the arms 41 and 40 in sequence. In the present illustrative disclosure, the thermostat is shown as comprising generally a bulb 44 located in the oven and containing an expansible fluid. The bulb is connected by a tube 45 to an anchored casing 46 within which is a bellows 47. Associated with the bellows and movable thereby is an adjustable screw 50 to the outer end of which may be fixed a dial 51. The member 50 has a shoulder 52 engageable against a lever 53 pivoted at one end, as at 54. Connected to the other end of the lever is a bar 55 formed of insulating material and having two abutments 56 and 57 adapted to respectively engage the arms 41 and 40. These abutments are so positioned that when the temperature rises and the bar is moved to the left, referring to Figs. 1 and 2, the abutment 56 will first engage the switch arm 41 and move it to open position, and then upon further rise of temperature the abutment 57 will engage the switch arm 40 and move it to open position.

To facilitate the description of the operation of the system and the various circuits which may be established, it may be assumed that 110 volts is furnished between each of the supply lines L-1 and L-2 and the neutral wire N, with a total voltage of 220 volts between the supply lines; the resistances of the broil element and bake element are such that 2400 watts will be consumed by each of these elements when connected across the outside lines; and that the bake element is connected at its mid-point to the neutral wire N. It is to be understood that these power values are assumed merely to describe one exemplary set of conditions under which the oven may be operated. For example, the neutral need not be connected to the midpoint of the bake element, but on the other hand, it may be connected at any desired point between the ends of the element which will give the best operation, depending upon the characteristics of the particular oven.

Assuming that it is desirable to rapidly preheat the oven and then carry out a cooking operation, such as a roasting operation at a relatively high heat and under a balanced heat oven condition, the dial 51 of the thermostat is set at the desired temperature for carrying out the roasting operation. When the oven is not in operation, the dial 51 is in off position, and when in such position the switch arms 40 and 41 are held open by the bar 55. During the setting of the dial, the bar 55 is moved to the right so that the switch arms 40 and 41 will move from the open position to the closed position shown in Fig. 1. It may be assumed, for exemplary purposes, that the dial is set at 400°. When this is done, the preheat circuit shown in Fig. 1 is established. It will be seen that the broil element and bake element are connected, in effect, in parallel across the supply lines L-1 and L-2. This provides for maximum rate of heat so that the temperature of the oven is quickly raised. Under the exemplary set of conditions above specified, each element will consume 2400 watts, making a total of 4800 watts. In the foregoing description it has been assumed that the point 12 to which the neutral wire 11 is connected is exactly at the center of the bake element whereby the resistances of the portions 13 and 14 are equal. It is not essential that the exact midpoint be selected and the effect of varying the neutral wire from the exact center position will be to increase the wattage.

When the oven has attained a predetermined temperature of say 350°, the switch arm 41 is moved by the thermostat to the open position shown in Fig. 2, thus establishing a circuit which will give balanced heat conditions within the oven during which time the broil element is used to supply a relatively small amount of heat to the upper part of the oven. More particularly, it will be seen that when the switch arm 41 is opened, the part 13 of the bake element is connected across the supply line L-2 and the neutral wire N and broil element 15 and the other part 14 of the bake element are connected in series across the supply line L-2 and the neutral and in parallel with the first mentioned bake element part 13. Under the assumed exemplary set of conditions above specified, the part 13 of the bake element consumes 1200 watts, the broil element will only consume 266 watts and the part 14 of the bake element will consume only 133 watts. Thus, under these conditions, the oven is being heated by a total of approximately 1600 watts.

The oven will further be heated above said temperature of 350° F., but at a slower rate, by the 1600 watts referred to above until the exemplary maximum desired temperature of 400° F. is reached within the oven. At that time the switch arm 40 will be moved by the thermostat to separate the contact 40' from contact 42. When this occurs, both the broil element and the bake element are disconnected from the supply conductors L-1 and L-2 and no additional heat will be furnished to the oven until the temperature within the oven drops a predetermined amount to, for example, 385° F. The drop in temperature will require a number of minutes, possibly five, for example, in a specific oven. When the latter temperature is reached, the arm 40 will move in an opposite direction to restore the contact 40' to engagement with contact 42 and the aforementioned 1600 watts will be available again gradually to increase the temperature of the oven to the exemplary maximum 400° F. Inasmuch as a materially lower rate of power is used to heat the oven by the circuit described immediately above, a number of minutes will be required to restore the temperature of the oven to 400° F. In the specific exemplary oven referred to above, possibly three minutes may be required. Following this, the arm 40 again is moved to separate the contact 40' from engagement with contact 42 to disconnect all heating elements from the main supply lines so that the oven will again slowly cool to the exemplary 385° F., and such cycling continues by periodic movement of the arm 40 until the desired cooking operation is completed. At this time, the dial of the thermostat may be turned to "off" position thereby causing the member 55 to move the switch arms 40 and 41 to open position.

Figure 6:
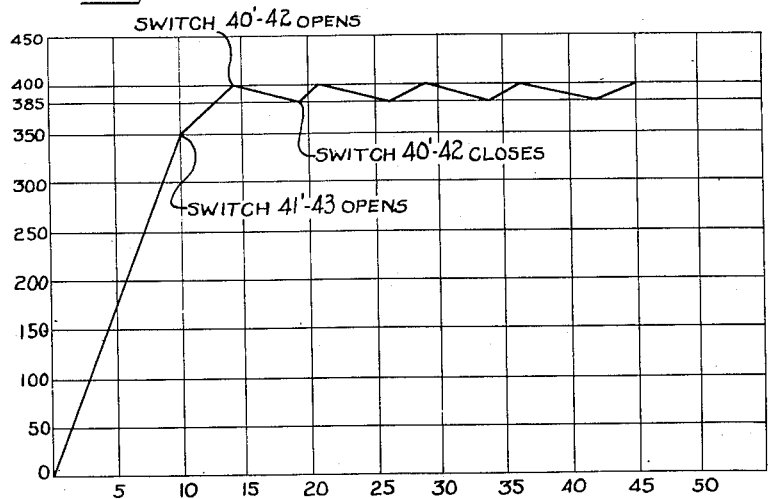
Fig. 6 is a chart showing an exemplary temperature curve when the desired heat of the oven, as determined by the dial setting of the thermostat, is under the control of the thermostat.

Fig. 6 is a diagrammatic view showing an exemplary heat curve resulting from the functioning of the circuit illustrated in Fig. 2 for producing balanced heat conditions within the oven. From this curve, it will particularly be seen that when the oven is being heated for cooking operations under such balanced heat conditions, the upper portion of the curve illustrating the heat used during such baking operations is relatively flat, thus indicating a substantially uniform supply of heat. The temperature varies slowly within a narrow range of maximum and minimum limits. Under the exemplary conditions described above relative to Fig. 2, each cycle of the arm 40 extends over an appreciable period of time, amounting to about eight minutes in the specific example described above. Since only a relatively small rate of power is used to maintain maximum baking conditions, materially less arcing of the switch contacts results. Further, by using the broil element 15 under these conditions to furnish a relatively small amount of heat to the upper portion of the oven, a much more uniform disposition of heat is obtained which is substantially balanced throughout the oven during such baking operation.

When it is desired to effect a usual baking operation by the use of the bake element only, the lever 32 of the manually settable switch is moved to the position shown in Fig. 3, thereby moving the switch arms 23 and 24 associated with the broil element into open position without disturbing the closed positions of the switch arms 21 and 22 which are associated with the ends of the bake element. The dial of the thermostat is set to the desired temperature (say, 450°) to be maintained within the oven during the baking operation. When the dial is so set, the switch arms 40 and 41 are permitted to move from open position to the closed position shown by full lines in Fig. 3. The entire bake element is thus connected across the outside lines L-1 and L-2, and under the exemplary set of conditions above specified, the current input is 2400 watts and the oven is quickly brought up to the desired baking temperature. When the temperature within the oven reaches a predetermined figure, 400° F. for example, the thermostat will operate to move the switch arm 41 from the full line position to the open position indicated by broken lines in Fig. 3. Thus, the part 14 of the bake element is disconnected from the circuit and the current will then flow only from the line L-2 through the switch arms 40 and 21, and part 13 of the bake element, and the wire 11 to the neutral wire N. Under these circumstances only 1200 watts will be consumed by the part 13 of the bake element. As in the case of the automatic change-over from the preheat condition to the balanced heat condition, the temperature of the oven will continue to rise to that indicated by the dial setting which, under the present assumption, is 450° F. At this time, the thermostat, through the member 55, will move the switch arm 40 to open position, thus entirely disconnecting the bake element from the circuit. Under the exemplary conditions described, the switch arm 40 will cycle between the temperature of 450° F. and the temperature of 435° F., for example. Thus, a relatively even temperature is maintained within the oven.

When it is desired to carry out a broiling operation, the broil element 15 only is employed, the same being connected across the main lines of the supply system as indicated in Fig. 4. To establish this circuit, the lever 32 of the settable switch is turned to the righthand position indicated in Fig. 4. Thereby, switch arms 21 and 22 are moved to the open position shown in that figure while the switch arms 23 and 24 remain in closed positions. Under the exemplary conditions described heretofore, the broil element will consume 2400 watts. Under these broiling conditions, neither part of the bake element is in circuit.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

1. In a control system for an electric oven, a three-wire current supply system having two main lines and a neutral wire, a broil element in the upper portion of said oven, a bake element in the lower portion of said oven and connected at a point between its ends directly to said neutral wire; a first switch connected to one end of the broil element and to one end of the bake element and having contact means forming a contact only with the bake element in a first position of the switch and forming a contact with both elements in a second position of the switch; a second switch connected to the opposite ends of the broil element and the bake element having contact means forming a contact only with the bake element in a first position of the switch and forming a contact with both elements in a second position of the switch; and manually operable means for moving the first and second switches in unison selectively into said first and second positions.

2. In a control system for an electric oven, a three-wire current supply system having two main lines and a neutral wire, a broil element in the upper portion of said oven, a bake element in the lower portion of said oven and connected at a point between its ends directly to said neutral wire; a first switch connected to one end of the broil element and to one end of the bake element having contact means forming a contact only with the bake element in a first position of the switch, forming a contact with both elements in a second position of the switch, and forming a contact only with the broil element in a third position of the switch; a second switch connected to the opposite ends of the broil element and the bake element having contact means forming a contact only with the bake element in a first position of the switch, forming a contact with both elements in a second position of the switch, and forming a contact only with the broil element in a third position of the switch; and manually operable means for moving the first and second switches in unison selectively into said first, second and third positions.

3. In a control sytem for an electric oven, a three-wire current supply system having two main lines and a neutral wire, a broil element in the upper portion of said oven, a bake element in the lower portion of said oven and connected at a point between its ends directly to said neutral wire; a first switch connected to one end of the broil element and to one end of the bake element having contact means forming a contact only with the bake element in a first position of the switch and forming a contact with both elements in a second position of the switch; a second switch connected to the opposite ends of the broil element and the bake element and having contact means connected to one of said main lines forming a contact only with the bake element in a first position of the switch and forming a contact with both elements in a second position of the switch; manually operable means for moving the first and second switches in unison selectively into said first and second positions; and a thermostatic switch connected between the other of said main lines and the said contact means of the first switch.

4. In a control system for an electric oven, a three-wire current supply system having two main lines and a neutral wire, a broil element in the upper portion of said oven, a bake element in the lower portion of said oven and connected at a point between its ends directly to said neutral wire; a first switch connected to one end of the broil element and to one end of the bake element having contact means forming a contact only with the bake element in a first position of the switch, forming a contact with both elements in a second position of the switch, and forming a contact only with the broil element in a third position of the switch; a second switch connected to the opposite ends of the broil element and the bake element and having contact means connected to one of said main lines forming a contact only with the bake element in a first position of the switch, forming a contact with both elements in a second position of the switch, and forming a contact only with the broil element in a third position of the switch; manually operable means for moving the first and second switches in unison selectively into said first, second and third positions; and a thermostatic switch connected between the other of said main lines and the said contact means of the first switch.

5. In a control system for an electric oven, a three-wire current supply system having two main lines and a neutral wire, a broil element in the upper portion of said oven, a bake element in the lower portion of said oven and connected at a point between its ends directly to said neutral wire; a first switch connected to one end of the broil element and to one end of the bake element and having contact means forming a contact only with the bake element in a first position of the switch and forming a contact with both elements in a second position of the switch; a second switch connected to the opposite ends of the broil element and the bake element having contact means forming a contact only with the bake element in a first position of the switch and forming a contact with both elements in a second position of the switch; manually operable means for moving the first and second switches in unison selectively into said first and second positions; a thermostatic switch connected to said main lines and the said contact means of the first and second switches having a first position connecting the said contact means to different main lines, a second position connecting only one of said contact means to one of the main lines and a third position disconnecting both of said contact means from the main lines.

6. In a control system for an electric oven, a three-wire current supply system having two main lines and a neutral wire, a broil element in the upper portion of said oven, a bake element in the lower portion of said oven and connected at a point between its ends directly to said neutral wire; a first switch connected to one end of the broil element and to one end of the bake element having contact means forming a contact only with the bake element in a first position of the switch, forming a contact with both elements in a second position of the switch, and forming a contact only with the broil element in a third position of the switch; a second switch connected to the opposite ends of the broil element and the bake element having contact means forming a contact only with the bake element in a first position of the switch, forming a contact with both elements in a second position of the switch, and forming a contact only with the broil element in a third position of the switch; manually operable means for moving the first and second switches in unison selectively into said first, second and third positions; and a thermostatic switch connected to said main lines and the said contact means of the first and second switch having a first position connecting the said contact means to different main lines, a second position connecting only one of said contact means to one of the main lines and a third position disconnecting both of said contact means from the main lines.

7. In a control system for an electric oven, a three-wire current supply system having two main lines and a neutral wire, a broil element in the upper portion of said oven, a bake element in the lower portion of said oven and connected at a point between its ends directly to said neutral wire; a first switch connected to one end of the broil element and to one end of the bake element having contact means forming a contact only with the bake element in a first position of the switch, forming a contact with both elements in a second position of the switch, and forming a contact only with the broil element in a third position of the switch; a second switch connected to the opposite ends of the broil element and the bake element having contact means forming a contact only with the bake element in a first position of the switch, forming a contact with both elements in a second position of the switch, and forming a contact only with the broil element in a third position of the switch; manually operable means for moving the first and second switches in unison selectively into said first, second and third positions; a third switch connected to said main lines and the said contact means of the first and second switches having a first position connecting the said contact means to different main lines, a second position connecting only one of said contact means to one of the main lines and a third position disconnecting both of said contact means from the main lines; manually operable means for setting the third switch in said first position, and temperature responsive means for moving the switch in sequence to said second and third positions at selected elevated temperatures.

References Cited in the file of this patent

UNITED STATES PATENTS

| Number | Name | Date |
| --- | --- | --- |
| 1,960,179 | Barksdale | May 22, 1934 |
| 2,177,281 | Lockwood | Oct. 24, 1939 |
| 2,201,584 | Kahn et al. | May 21, 1940 |
| 2,203,224 | Kimball | June 4, 1940 |
| 2,203,236 | Randolph et al. | June 4, 1940 |
| 2,218,778 | Weimer | Oct. 22, 1940 |
| 2,295,298 | Sharp | Sept. 8, 1942 |
| 2,388,839 | Fry | Nov. 13, 1945 |
| 2,402,354 | Waddell | June 18, 1946 |
| 2,402,787 | Stickel | June 25, 1946 |
| 2,442,900 | McCormick | June 8, 1948 |
| 2,483,831 | Illian | Oct. 4, 1949 |
| 2,541,314 | Weber et al. | Feb. 13, 1951 |